US005288120A

United States Patent [19]
Schopfer

[11] Patent Number: 5,288,120
[45] Date of Patent: Feb. 22, 1994

[54] GARMENT CARRIER

[76] Inventor: E. Kevin Schopfer, 474 Glen Rd., Weston, Mass. 02193

[21] Appl. No.: 922,030

[22] Filed: Jul. 29, 1992

Related U.S. Application Data

[63] Continuation-in-part of Ser. No. 878,630, May 5, 1992.

[51] Int. Cl.⁵ .................................................. A45F 5/10
[52] U.S. Cl. .................................. 294/137; 294/145; 294/165
[58] Field of Search ............... 294/137, 145, 149, 151, 294/153, 156, 158, 165, 167, 169, 87.2; 206/300

[56] References Cited

U.S. PATENT DOCUMENTS

| | | | |
|---|---|---|---|
| 2,696,401 | 12/1954 | Church et al. | 294/87.2 |
| 2,711,922 | 6/1955 | Batkin | 294/87.2 |
| 2,740,657 | 4/1956 | Poupitch | 294/87.2 |
| 2,769,587 | 11/1956 | Threeton | 224/45 |
| 2,822,208 | 2/1958 | Then | 294/87.2 |
| 3,606,967 | 9/1971 | Roberts | 224/45 |
| 3,633,802 | 1/1972 | Webster | 224/45 |
| 3,692,218 | 9/1972 | Friedman | 224/45 |
| 3,885,723 | 5/1975 | Magnie | 224/45 |
| 4,030,649 | 6/1977 | Potoroka | 294/149 |
| 4,112,541 | 9/1978 | Tetradis | 294/137 X |
| 4,288,012 | 9/1981 | Doak | 294/143 |
| 4,296,959 | 10/1981 | Helbig | 294/143 |
| 4,335,839 | 6/1982 | Kessler et al. | 294/142 |
| 4,474,316 | 10/1984 | Philibert | 223/88 |
| 4,557,516 | 12/1985 | Usner | 294/143 |
| 4,558,896 | 12/1985 | Farnworth | 294/167 X |
| 4,895,295 | 1/1990 | Montgomery et al. | 294/156 X |

Primary Examiner—David M. Mitchell
Assistant Examiner—Dean J. Kramer
Attorney, Agent, or Firm—Fish & Richardson

[57] ABSTRACT

A garmet carrier, and a blank for forming a garment carrier, may be used once, or a few times, for transport of one or a few garments on hanger hooks, and then discarded. The carrier has a body of thin material, e.g. corrugated cardboard or biodegradable or other plastic, forming a handle and defining an orifice for receiving the free end of one or a few hangers. A hinged flap extends at least across the body and may be secured thereto.

22 Claims, 5 Drawing Sheets

GARMENT CARRIER

This application is a continuation-in-part application of U.S. Ser. No. 07/878,630, filed May 5, 1992, the disclosure of which is incorporated herein by reference.

BACKGROUND OF THE INVENTION

The invention relates to a device for carrying one or a few garments on hangers, and in particular to such a device which may be used once, or a few times.

When transporting one or a few garment, e.g. after purchase or dry cleaning, the garments are usually on hooked hangers. The hooks, which may be of different shapes and types, can create a hazard and/or an annoyance as they become engaged on clothing and anything else that passes within range. The collection of hooks is often bulky, and it is often a chore or even painful to carry one or more garments for any distance or period of time. It is also difficult to engage the hooks as a unit, e.g. on the garment hook in an automobile or over clothes racks or the like. Finally, if the hooks are not secured together in a manner to be handled as a unit, the unengaged hanger, and the clothing placed upon it, may be dropped, or even lost.

Others have thought to provide a case for garment hooks to assist travelers using a garment or suit bag. For example, Threeton U.S. Pat. No. 2,769,587 describes a tubular case which opens along a central vertical axis and provides a ring for receiving the ends of the hangers. Magnie U.S. Pat. No. 3,885,723 describes a carrier device which is flexed to permit a hanger hook to be inserted into an elongated cavity. Doak U.S. Pat. No. 4,288,012 describes a handle which defines a magazine for receiving garment hanger hooks to be secured by a removable retainer pin.

SUMMARY OF THE INVENTION

According to one aspect of the invention, a garment carrier formed of a thin piece of material comprises a body having an upper portion defining a first orifice extending therethrough, the upper portion forming a handle, and a lower portion having a first vertical edge and defining a second orifice for receiving a free end of one or more garment hanger hooks therethrough, a first flap having a first vertical edge and a second vertical edge generally parallel thereto, the lower portion and the first flap joined in a hinged connection along respective first vertical edges, a second flap having a second vertical edge, the first and second flaps joined along respective second vertical edges, the second flap adapted for movement from a first position with the inner face surface spaced from face surfaces of the lower portion and a second position with the inner face surface disposed in opposition to, and generally in registration with, an inner face surface of the lower portion, the garment carrier further comprising means for securing the second flap in the second position for transport and storage of garments.

Preferred embodiments of this aspect of the invention may include one or more of the following features. The first and second flaps are joined along respective second vertical edges in hinged connection. The second flap has a third vertical edge generally parallel to the second vertical edge, and the garment carrier further comprises a third flap having a third vertical edge and a fourth vertical edge generally parallel thereto, the second and third flaps joined in a hinged connection along respective third vertical edges, and a fourth flap having an inner face surface and a fourth vertical edge, the third and fourth flaps joined along respective fourth vertical edges, the fourth flap adapted for movement from a first position with its inner face surface spaced from face surfaces of the lower portion and a second position with its inner face surface disposed in opposition to an opposed outer face surface of the lower portion, the outer face surface being opposite to the inner face surface of the lower portion disposed in opposition to the inner face surface of the second flap. The means for securing the second flap in the second position for transport and storage of garments comprises a first securement tab extending from the body and a second securement tab having a surface disposed in opposition to a surface of the first securement tab when the second flap is in the second position, and means for joining the securement tabs, e.g. a staple. The third and fourth flaps are joined along respective fourth vertical edges in hinged connection. The inner face surface of the fourth flap is disposed generally in registration with the opposed face surface of the lower portion. The first orifice has a first, upper, generally horizontal edge and the garment carrier further comprises a fifth flap having a surface and a first horizontal edge, the upper portion and the fifth flap joined in a hinged connection along respective first horizontal edges, whereby the fifth flap defines a carrying surface for distributing load during transport of garments. The first orifice has a second, lower, generally horizontal edge, and the garment carrier further comprises a sixth flap having a surface and a first horizontal edge, the upper portion and the sixth flap joined in a hinged connection along the second, lower, generally horizontal edge. The carrying surface is formed by a surface of the upper portion, dislodged from the first orifice. The first and second flaps together define a third orifice. The first securement tab is formed of material dislodged from the third orifice. The thin piece of material is formed of a biodegradable material, e.g. corrugated cardboard, or plastic.

According to another aspect of the invention, a blank of corrugated cardboard and the like for forming a garment carrier comprises a body having an upper portion defining a first orifice extending therethrough, and a lower portion having a first vertical edge and defining second and third orifices, a first flap having a first vertical edge and a second vertical edge generally parallel thereto, the lower portion and the first flap joined in a hinged connection along respective first vertical edges, a second flap having a second vertical edge, the first and second flaps joined along respective second vertical edges, and the first and second flaps together defining a third orifice, and a first securement tab formed by dislodgement of material from the third orifice, the securement tab extending from the body.

Preferred embodiments of this aspect of the invention may include one or more of the following features. The first and second flaps are joined along respective second vertical edges in hinged connection. The second flap has a third vertical edge generally parallel to the second vertical edge, and the blank further comprises a third flap having a third vertical edge and a fourth vertical edge generally parallel thereto, the second and third flaps joined in a hinged connection along respective third vertical edges, and a fourth flap having an inner face surface and a fourth vertical edge, the third and fourth flaps joined along respective fourth vertical edges, preferably in hinged connection. The fourth flap has a fifth vertical edge spaced from the fourth vertical edge, and the fourth flap defines a second securement tab extending from the fifth vertical edge. The first orifice has a first, upper, generally horizontal edge and the blank further comprises a fifth flap having a surface and a first horizontal edge, the upper portion and the fifth flap joined in a hinged connection along respective first horizontal edges. The first orifice has a second, lower, generally horizontal edge and the blank further comprises a sixth flap having a surface and a second first horizontal edge, the upper portion and the sixth flap joined in a hinged connection along respective second horizontal edges. The blank may be formed of a biodegradable material such as cardboard, or plastic.

The objectives of the invention include providing a device for carrying one or few garments on hangers, that is low in cost for both material and labor, and that may be discarded after, e.g., a single use.

Other features and advantages will be seen from the following description of a presently preferred embodiment, and from the claims.

DESCRIPTION OF THE PREFERRED EMBODIMENT

Figure 1:
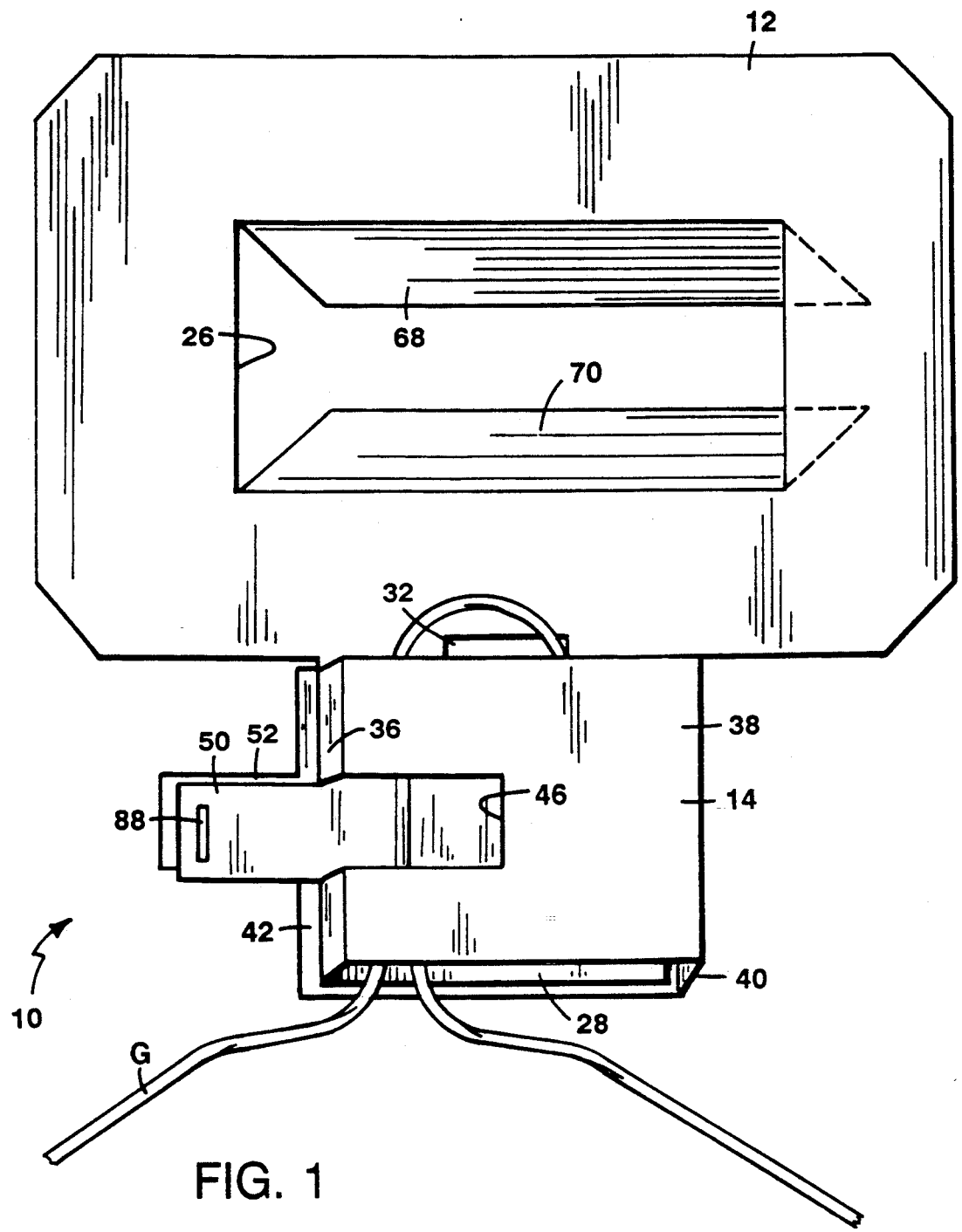
FIG. 1 is a front perspective view of a garment carrier of the invention.
Figure 2:
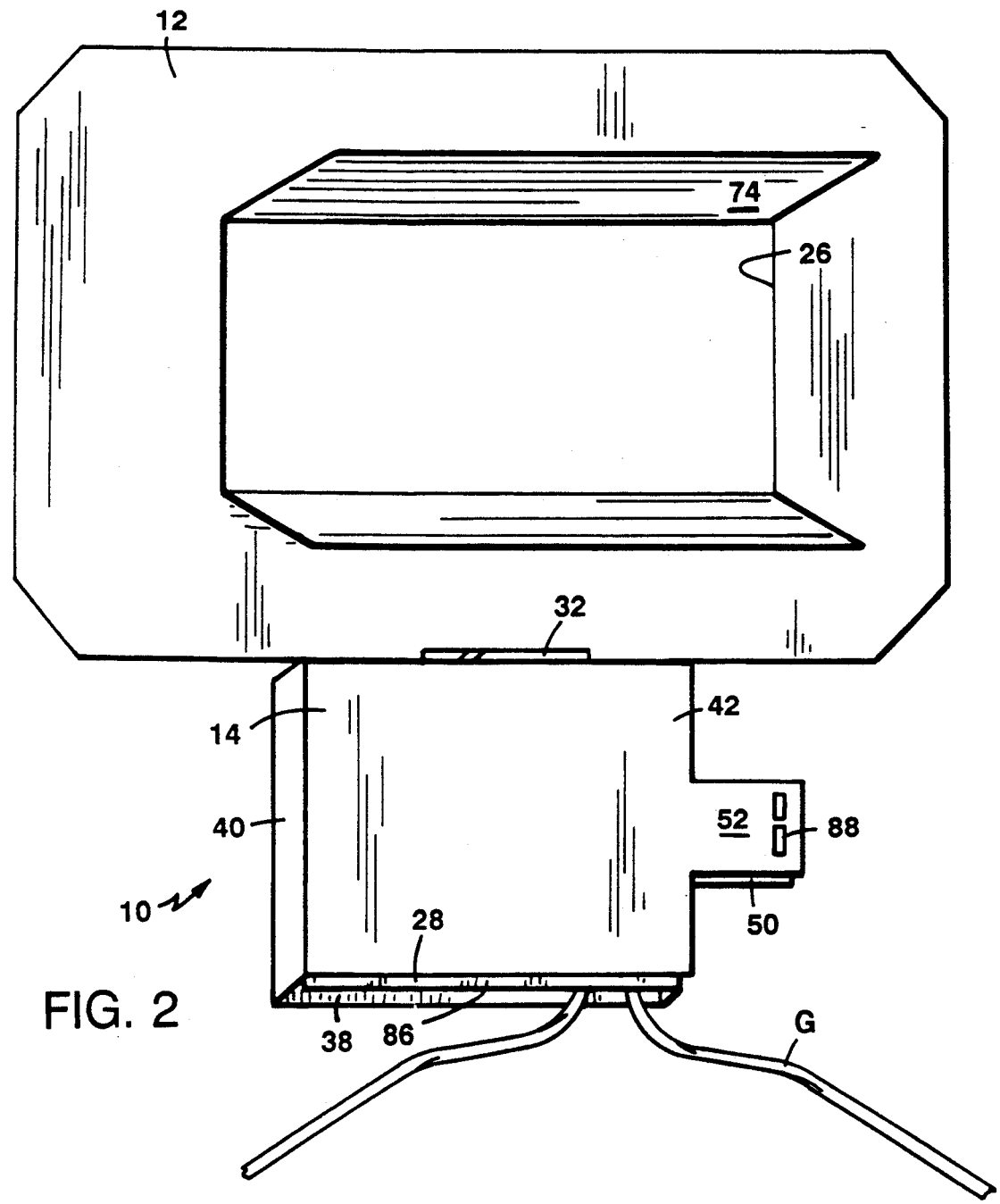
FIG. 2 is a rear perspective view the garment carrier of FIG. 1.

Referring to FIGS. 1 and 2, a garment carrier 10 of the invention has a handle 12, and a lower segment 14 for receiving and retaining one or a few hanger hooks, G, for transport and storage of garments.

Figure 3:
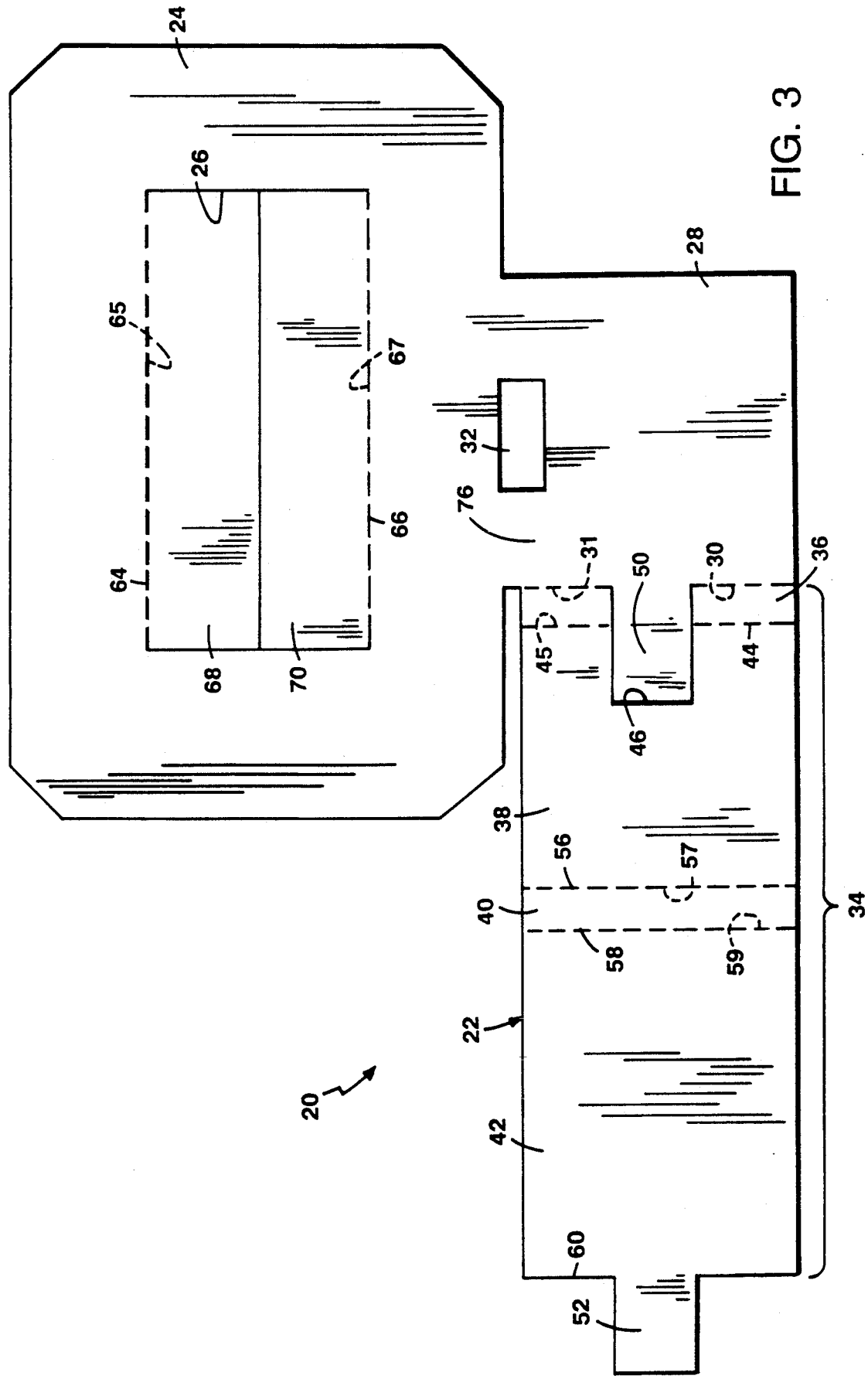
FIG. 3 is a plan view of a blank for forming the garment carrier of FIG. 1.

Referring now to FIG. 3, the garment carrier 10 is formed from a blank 20 of a thin piece of suitable material such as plastic or a biodegradable material such as corrugated cardboard or plastic.

The blank 20 has a body 22 having an upper portion 24 defining a first orifice 26 extending therethrough, and a lower portion 28 having a first vertical edge 30 and defining a second orifice 32. In the preferred embodiment, the body 22 of the blank 20 has a leg 34 consisting of a first flap 36, a second flap 38, a third flap 40 and a fourth flap 42 hingedly connected in sequence from the first vertical edge, at first fold-line 31.

By way of example only, in the preferred embodiment shown, the body 22 is about 6¼ inches high, with the upper portion 24 about 6¼ inches wide and the lower portion 28 about 2½ inches wide. The first orifice 26 is about 3¾ inches wide by about 2 inches high. The second orifice 32 is about ⅜ inch wide by about ⅜ inch high. The flaps 36, 38, 40 and 42 are each about 2¼ inches high. The first and third flaps 36, 40 are each about ¼ inch wide. The second and fourth flaps 38, 42 are each about 2½ inches wide.

The first flap 36 has first vertical edge 30 and a second vertical edge 44 generally parallel thereto, the lower portion 28 and the first flap 36 joined in a hinged connection along the first vertical edge, at first fold-line 31. The second flap 38 also has second vertical edge 44, with the first flap 36 and the second flap 38 joined along the second vertical edge, preferably in a hinged connection, at second fold-line 45. The first and second flaps 36, 38 together define a third orifice 46. A first securement tab 50, extending from the lower portion 28 of the body, is formed by dislodgement of material from the third orifice 46. By way of example, the first securement tab 50 is about 1 inch long by about ½ inch high.

The second flap 38 also has a third vertical edge 56 generally parallel to the second vertical edge 44, and the third flap 40 has the third vertical edge 56 and a fourth vertical edge 58 generally parallel thereto. The second flap 38 and the third flap 40 are joined in a hinged connection along the third vertical edge 56, at third fold-line 57.

The fourth flap 42 has a fourth vertical edge 58, where the third and fourth flaps are joined, preferably in a hinged connection, at fourth fold-line 59. The fourth flap 42 also has a fifth vertical edge 60 from which there extends a second securement tab 52, also about 1 inch long by about ½ inch high.

The first orifice 26, formed by the upper portion 24 of the body, has a first, upper, generally horizontal edge 64 and a second, lower, generally horizontal edge 66, and blank 20 further comprises a fifth flap 68 and a sixth flap 70. The upper portion 24 and the fifth flap 68 are joined in a hinged connection along the first horizontal edge 64, at fifth fold-line 65, and the upper portion 24 and the sixth flap 70 are joined in a hinged connection along the second horizontal edge 66, at sixth fold-line 67. By way of example, the fifth and sixth flaps 68, 70 are each about 4 inches wide by about 1 inch high, the flaps being formed by dislodgement of the material from the first orifice 26.

Figure 4:
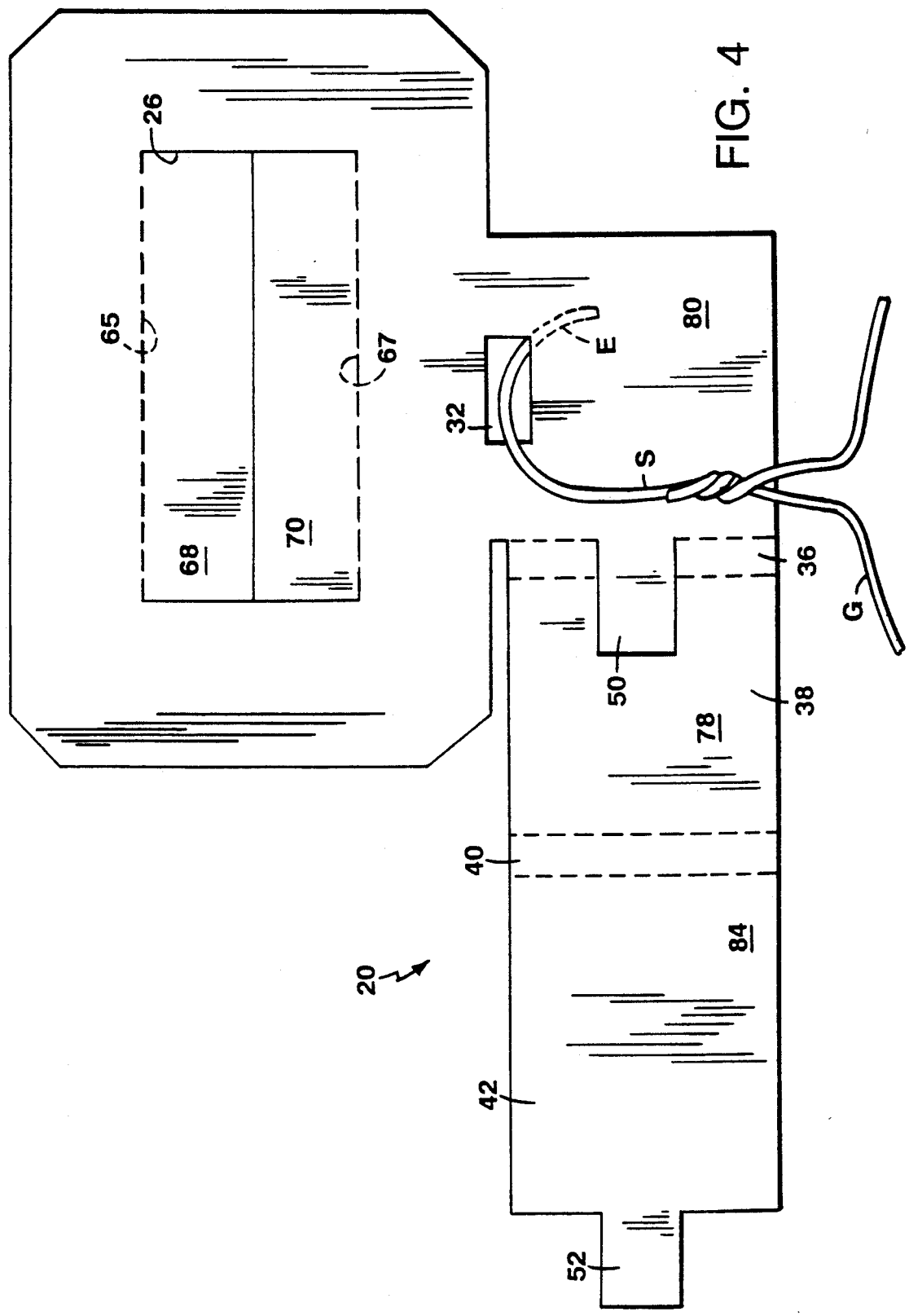
FIGS. 4 and 5 are somewhat diagrammatic sequential views showing formation of the blank of FIG. 3 into a garment carrier of the invention.
Figure 5:
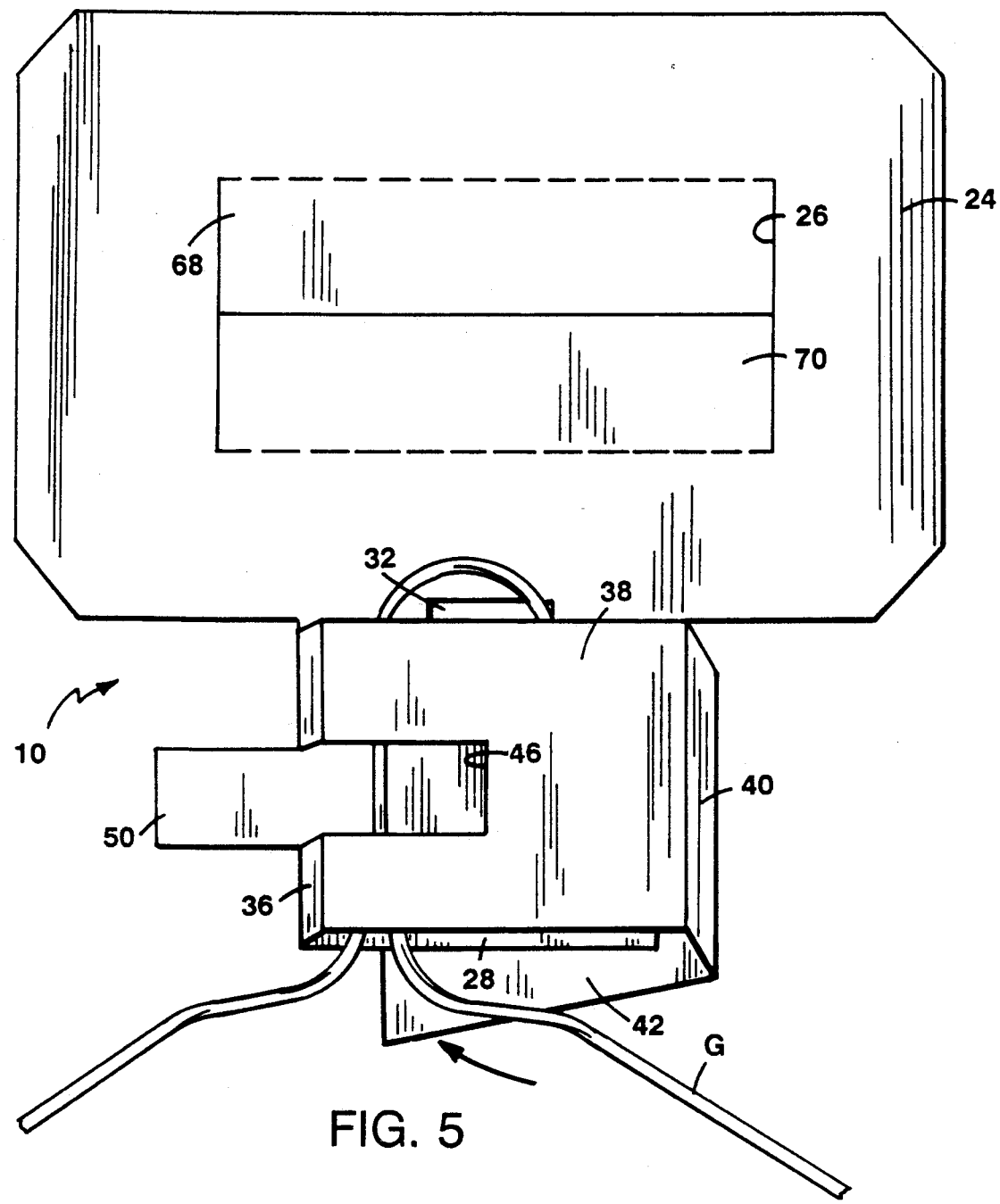

Referring now also to FIGS. 1, 4 and 5, to form the garment hanger 10 of the invention from the blank 20, the material is fully removed from the first orifice 26. The material in the first orifice 26 is dislodged to form a handle opening and folded at fold-lines 65, 67, thus to place surface 74 of flap 68 in a position to distribute the weight of the carrier and garment(s) away from the first horizontal edge 64 for improved comfort for the user (FIGS. 1 and 2). The material in the second orifice 32 is removed, and the material in the third orifice 46 is dislodged to form the first securement tab 50. The blank 20 is next folded at fold-lines 31, 45, 57 and 59 to form first flap 36, second flap 38, third flap 40 and fourth flap 44 extending in sequence from lower portion 28 at first vertical edge 30.

Referring now to FIG. 4, the free end, E, of one or more garment hangers, G, is placed through the second orifice 32, with the shaft, S, of the hanger disposed in the region 76, generally adjacent the first vertical edge 30. The second flap 38 is moved from a first position (FIG. 4), with its inner face surface 78 spaced from face surfaces of the lower portion 28, toward a second position (FIG. 5), with the inner face surface 78 disposed in opposition to, and generally in registration with, inner face surface 80 of the lower portion.

Referring now to FIG. 5, the third flap 40 and the fourth flap 42 are folded at fold-lines 57, 59 about the lower portion 28 of the blank 20, the fourth flap 42 being moved from a first position (FIG. 4) with its inner face surface 84 spaced from face surfaces of the lower portion 28 to a second position (FIG. 5) with the inner face surface 84 disposed in opposition to an opposed outer face surface 86 (FIG. 2) of the lower portion 28. (The outer face surface 86 being opposite to the inner face surface 80 of the lower portion 28 disposed in opposition to, and generally in registration with, the inner face surface 78 of the second flap 38.)

The first securement tab 50 and the second securement tab 52 are then joined together, e.g. by use of a staple 88, to secure the flaps about the lower portion. The material in the first orifice 26 dislodged to form flap 70 is folded at fold-line 67, thus to place flap 70 generally over the ends E of the garment hooks G (FIG. 1) in a manner to further protect against engagement with passing objects.

Other embodiments are within the following claims. For example, the first and second flaps, and also the third and fourth flaps, may be integrally formed, with the thickness offset provided in the preferred embodiment of the garment carrier by the first and third flaps (as described above) being instead accommodated, e.g., by bowing of the second and fourth flaps.

What is claimed is:

1. A garment carrier formed of a thin piece of material, comprising
    a body having an upper portion defining a first orifice extending therethrough, said upper portion forming a handle, and a lower portion having a first vertical edge and defining a second orifice for receiving a free end of one or more garment hanger hooks therethrough,
    a first flap having a first vertical edge and a second vertical edge generally parallel thereto, said lower portion and said first flap joined in a hinged connection along respective first vertical edges,
    a second flap having a second vertical edge, said first flap and said second flap joined along respective second vertical edges,
    said second flap adapted for movement from a first position with an inner face surface spaced from face surfaces of said lower portion and a second position with said inner face surface disposed in opposition to an inner face surface of said lower portion, and
    means for securing said second flap in said second position for transport and storage of garments comprising a first securement tab extending from said body and a second securement tab having a surface disposed in opposition to a surface of said first securement tab when said second flap is in said second position, and means for joining said first securement tab and said second securement tab.

2. The garment carrier of claim 1 wherein said first flap and said second flap are joined along respective second vertical edges in hinged connection.

3. The garment carrier of claim 1 wherein said second flap has a third vertical edge generally parallel to said second vertical edge, and said garment carrier further comprises
    a third flap having a third vertical edge and a fourth vertical edge generally parallel thereto, said second flap and said third flap joined in a hinged connection along respective third vertical edges, and
    a fourth flap having an inner face surface and a fourth vertical edge, said third flap and said fourth flap joined along respective fourth vertical edges,
    said fourth flap adapted for movement from a first position with its said inner face surface spaced from face surfaces of said lower portion and a second position with its said inner face surface disposed in opposition to an opposed outer face surface of said lower portion, said outer face surface being opposite to the inner face surface of said lower portion disposed in opposition to the inner face surface of said second flap.

4. The garment carrier of claim 1 wherein said third flap and said fourth flap are joined along respective fourth vertical edges in hinged connection.

5. The garment carrier of claim 3 wherein said inner face surface of said fourth flap is disposed generally in opposition to the opposed face surface of said lower portion.

6. The garment carrier of claim 1 wherein said means for joining said first securement tab and said second securement tab comprises a staple.

7. The garment carrier of claim 1 wherein said first orifice has a first, upper, generally horizontal edge and said garment carrier further comprises
    a fifth flap having a surface and a first horizontal edge, said upper portion and said fifth flap joined in a hinged connection along respective first horizontal edges,
    whereby said fifth flap defines a carrying surface for distributing load during transport of garments.

8. The garment carrier of claim 7 wherein said carrying surface is formed by a surface of said upper portion, dislodged from said first orifice.

9. The garment carrier of claim 1 or 7 wherein said first orifice has a second, lower, generally horizontal edge and said garment carrier further comprises
    a sixth flap having a surface and a first horizontal edge, said upper portion and said sixth flap joined in a hinged connection along said second, lower generally horizontal edge.

10. The garment carrier of claim 1 wherein said first flap and said second flap together define a third orifice.

11. The garment carrier of claim 10 wherein said first securement tab is formed of material dislodged from said third orifice.

12. The garment carrier of claim 1 wherein said thin piece of material is formed of a biodegradable material.

13. The garment carrier of claim 12 wherein said material is corrugated cardboard.

14. The garment carrier of claim 1 or 12 wherein said material is plastic.

15. A blank for forming a garment carrier, comprising
    a body having an upper portion defining a first orifice extending therethrough, and a lower portion having a first vertical edge and defining a second orifice,
    a first flap having a first vertical edge and a second vertical edge generally parallel thereto, said lower portion and said first flap joined in a hinged connection along respective first vertical edges,
    a second flap having a second vertical edge, said first flap and said second flap joined along respective second vertical edges, and said first flap and said second flap together defining a third orifice, and
    a first securement tab formed by dislodgement of material from said third orifice, said securement tab extending from said body.

16. The blank of claim 15 wherein said first flap and said second flap are joined along respective second vertical edges in hinged connection.

17. The blank of claim 15 wherein said second flap has a third vertical edge generally parallel to said second vertical edge, and said blank further comprises
    a third flap having a third vertical edge and a fourth vertical edge generally parallel thereto, said second flap and said third flap joined in a hinged connection along respective third vertical edges, and a fourth flap having an inner face surface and a fourth vertical edge, said third flap and said fourth flap joined along respective fourth vertical edges.

18. The blank of claim 17 wherein said third flap and said fourth flap are joined along respective fourth vertical edges in hinged connection.

19. The blank of claim 17 wherein said fourth flap has a fifth vertical edge spaced from said fourth vertical edge, and said fourth flap defines a second securement tab extending from said fifth vertical edge.

20. The blank of claim 15 wherein said first orifice has a first, upper, generally horizontal edge and said blank further comprises a fifth flap having a surface and a first horizontal edge, said upper portion and said fifth flap joined in a hinged connection along respective first horizontal edges.

21. The blank of claim 20 wherein said first orifice has a second, lower, generally horizontal edge and said blank further comprises a sixth flap having a surface and a second horizontal edge, said upper portion and said sixth flap joined in a hinged connection along respective second horizontal edges.

22. The blank of claim 15 wherein said thin piece of material is formed of a biodegradable material.

* * * * *